[United States Patent Office — 3,515,717 — Patented June 2, 1970]

3,515,717
PROCESS FOR ISOLATING ANTIBIOTICS
Dae Yang Cha, Oshtemo, and Heinz K. Jahnke, Kalamazoo, Mich., assignors to The Upjohn Company, Kalamazoo, Mich., a corporation of Delaware
No Drawing. Filed Dec. 16, 1968, Ser. No. 784,195
Int. Cl. C07c 47/18, 103/19; C07d 99/14
U.S. Cl. 260—210         10 Claims

ABSTRACT OF THE DISCLOSURE

Process for isolating a lincomycin antibiotic from fermentation beers or aqueous processing solutions by resin sorption of the lincomycin antibiotic on a resin comprising a non-ionic macro porous copolymer of styrene cross-linked with divinylbenzene. The resin is eluted with an organic or aqueous organic solvent in which the sorbed lincomycin antibiotic is soluble. This process is more efficient than a carbon adsorption process for recovering lincomycin from fermentation beers.

BRIEF SUMMARY OF THE INVENTION

Lincomycin is a valuable antibiotic produced by a fermentation process using the microorganism *Streptomyces lincolnensis* var. lincolnensis, NRRL 2936. The production, recovery, and characterization of lincomycin is described in U.S. Pat. 3,086,912. This patent discloses that lincomycin can be recovered from fermentation beers by extraction, adsorption on cation exchange resins, carbon or decolorizing resins. Though the solvent extraction procedure is given as the preferred procedure in U.S. 3,086,912, subsequent work on the lincomycin recovery process has settled on the use of activated carbon as the preferred recovery process.

The activated carbon recovery process is effective to recover lincomycin from filtered fermentation beer or other aqueous processing solutions containing lincomycin. The presence of mycelium, as found in a non-filtered fermentation beer, makes the activated carbon recovery process much less effective.

The process of the subject invention comprises the use of a resin which is effective to recover lincomycin from a non-filtered fermentation beer as well as a filtered fermentation beer. Thus, the subject invention process eliminates, if desired, the use of the costly filtration step in the recovery of lincomycin from fermentation beers.

The resin process of the subject invention has another advantage over the use of an activated carbon process for the recovery of lincomycin from fermentation beers or aqueous processing solutions. The resin used in the invention process can be regenerated by simply washing the resin with water after the resin has been eluted. In contrast, when an activated carbon column process is used to recover lincomycin, the carbon must be removed from the column and regenerated by heat treatment in a furnace. This carbon regeneration procedure is time consuming, expensive and requires the use of a special furnace.

The process of the subject invention comprises contacting a whole or filtered lincomycin fermentation beer, or an aqueous process solution containing a lincomycin antibiotic, with a resin which is a non-ionic macro porous copolymer of styrene cross-linked with divinylbenzene. The resin column is then eluted with an organic or aqueous organic solvent in which the lincomycin antibiotic is soluble.

DETAILED DESCRIPTION

Upon passing whole lincomycin fermentation beer through a column containing a resin, which is a non-ionic macro porous copolymer of styrene cross-linked with divinylbenzene, the lincomycin is selectively adsorbed by the resin. The resin of the invention is prepared by suspension polymerization of styrene divinylbenzene copolymers in the presence of a substance which is a good solvent for the copolymer. See JACS 84, 306 (1962). Suitable resins are known by the tradenames Amberlite XAD-1 and Amberlite XAD-2 (Rohm & Haas Co.).

The resin is eluted with an organic or aqueous organic solvent in which the sorbed lincomycin antibiotic is soluble. Suitable elution solvents for lincomycin are lower-alkanols, e.g., methanol, ethanol, isopropanol, the butanols, and the like; lower-alkyl esters of lower-alkanoic acids, e.g., ethyl acetate, n-butyl acetate, amyl acetate, and the like; lower-alkanones, e.g., acetone, methyl ethyl ketone, isopropyl n-butyl ketone, and the like; and chlorinated lower-alkanes, e.g., methylene chloride, chloroform, ethylene dichloride, and the like. Methyl ethyl ketone is the preferred elution solvent for lincomycin.

The process of the subject invention can be carried out by batch sorption of the lincomycin antibiotic on the resin, disclosed herein, or by continuous stirred tank sorption. The mechanical strength of the resin, disclosed herein, makes it especially useful in continuous stirred tank sorption.

Though Amberlite XAD-1 and Amberlite XAD-2 are known in the art as adsorbents for various pharmaceuticals, including some antibiotics such as tetracycline, oxytetracycline, and oleandomycin, the prior art does not teach or even suggest the use of such resins to adsorb lincomycin, streptomycin and neomycin in a recovery process. The prior art teaches that Amberlite XAD-1 and Amberlite XAD-2 are useful to adsorb antibiotics having a low water solubility and a high alcohol solubility. Lincomycin does not fit this criteria because it has high solubilities in both water and alcohol. Thus, it is unexpected that such resins can be used to recover lincomycins from fermentation beers. Also, streptomycin and neomycin do not fit the criteria for the above resins because these antibiotics have a high solubility in water and a low solubility in alcohol. Further, the prior art neither teaches nor suggests the use of the resins of the subject invention to adsorb antibiotics from whole fermentation beers. Thus, the sorption of antibiotics from whole fermentation beers is a distinct advancement in the art of recovering antibiotics from such sources. The savings in money and filtration equipment realized in the invention process is readily apparent.

Purification of the recovered lincomycin can be accomplished by procedures disclosed in U.S. Pat. 3,086,912 as well as by other well-known lincomycin purification procedures.

The subject invention process can be used to recover various antibiotics of the lincomycin family from fermentation beers or aqueous processing solutions having the formula:

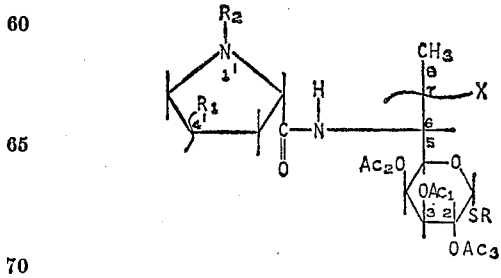

wherein R is methyl or ethyl; $R_1$ is cis or trans alkyl of 2 to 8 carbon atoms, inclusive; $R_2$ is hydrogen or alkyl to 8 carbon atoms, inclusive; X is hydroxy, chlorine, bromine, or iodine, each in the (R) or (S) configuration; $Ac_1$ and $Ac_2$ are hydrogen or acyl, selected independently, wherein acyl is the acyl of a hydrocarbon carboxylic acid of not more than 18 carbon atoms, or a halo-, nitro-, hydroxy-, amino-, cyano-, thiocyano-, or lower alkoxy hydrocarbon carboxylic acid of a total of up to 18 carbon atoms; and, $Ac_3$ is of the same group as $Ac_1$ and $Ac_2$, or phosphate.

The lincomycin compounds, herein defined, can be prepared by procedures disclosed in various patents, publications and patent applications. These are as follows:

Lincomycin—U.S. Patent 3,086,912 with reference to Formula I, wherein—
    R=Methyl or Ethyl—U.S. Pat. 3,380,992 (specification and Example 12)
    $R_1$=cis or trans alkyl to 8 carbon atoms—U.S. Pat. 380,992 (specification and Example 1)
    $R_2$=Hydrogen or alkyl to 8 carbon atoms—U.S. Pat. 3,380,992 (specification and Examples 1E and 1G+H)
    X=(S)OH—U.S. Pat. 3,380,992 (specification and Example 11-D)
    X=(R) or (S) Cl or Br—Belgium Pat. 676,202 U.S. application Ser. No. 498,989, filed Oct. 20, 1965
    X=(R) or (S) I—Application Ser. No. 696,518, filed Jan. 9, 1968

Lincomycin acylates—U.S. Pat 3,326,981
Lincomycin 2-acylates—Belgium Pat. 696,412, U.S. patent application Ser. No. 568,102, filed July 27, 1966
7-chlorolincomycin 2-acylates—U.S. patent application Ser. No. 637,358, filed May 10, 1967
7-chlorolincomycin 2-phosphates and lincomycin 2-phosphates—U.S. pat. application Ser. No. 602,116, filed Dec. 16, 1966.

Of the above compounds, the compound 7(S)-chloro-7-deoxylincomycin is also known by the generic name "clindamycin."

The subject invention process also can be used to recover the antibiotic celesticetin (U.S. Pat. 2,928,844) from fermentation beers or aqueous processing solutions containing celesticetin. Further, the subject invention process can be used to recover the well-known antibiotics streptomycin and neomycin from fermentation beers or aqueous processing solutions. Further, the invention process can be used to adsorb antibiotics such as tetracycline, oxytetracycline, oleandomycin, novobiocin, penicillin G, penicillin V, as well as gibberellic acid from whole fermentation beers.

The following examples are illustrative of the process of the present invention but are not to be construed as limiting.

EXAMPLE 1

Ten grams of wet Amberlite XAD-2 resin is added to 400 ml. of water in a stirred tank and 1400 ml. of a pure lincomycin solution (4 mg./ml.) is fed continuously at a flow rate of 10 ml./min. The loading obtained is 57.5 mg./g. of wet resin.

The lincomycin sorbed on the above-described Amberlite XAD-2 resin is eluted as follows: The loaded resin is washed with hot water and eluted batch-wise with 100 ml. of 97% methyl ethyl ketone/100 g. of resin 3 times. This elutes 99% of lincomycin originally sorbed on the resin. The eluate is saturated with salt (NaCl) and the pH of the solution is adjusted to 9.0 with a 50% sodium hydroxide solution. The organic phase is separated from the aqueous phase and concentrated. Concentrated hydrochloric acid is added slowly with strong agitation to precipitate crude lincomycin HCl. Crude lincomycin HCl is further purified by dissolving in water, decolorizing with activated carbon and finally reprecipitating with acetone.

EXAMPLE 2

Five grams of wet Amberlite XAD-2 resin is added into 100 ml. of screened (larger solids removed) lincomycin fermentation beer at a pH of 8.5. The mixture is equilibrated overnight and the resin screened off. The starting beer contains 1.95 mg. of lincomycin/ml. of beer, and after equilibration, the concentration of beer drops to .38 mg./ml. The loading of lincomycin on the Amberlite XAD-2 resin is 31.4 mg./g. of resin. Lincomycin is eluted from the resin with 97% methyl ethyl ketone, as disclosed in Example 1.

EXAMPLE 3

Twenty grams of wet Amberlite XAD-2 resin is added to 100 ml. of a 5 mg./ml. streptomycin aqueous solution. The solution is equilibrated overnight and the resin screened off. All of the streptomycin is sorbed onto the resin and practically all of the streptomycin on the resin is eluted with methanol.

EXAMPLE 4

Twenty grams of wet Amberlite XAD-2 resin is added to 200 ml. of a 5 mg./ml. aqueous neomycin base solution at a pH of 12.0. The concentration of the neomycin base solution drops to 4.25 mg./ml. indicating 7.5 mg. of neomycin is loaded per 1 g. of resin.

EXAMPLE 5

Whole lincomycin fermentation beer is passed over the resin in Example 1 in the same manner as the lincomycin solution disclosed therein, and lincomycin is adsorbed onto the resin.

EXAMPLE 6

Lincomycin compounds, in filtered solutions and non-filtered fermentation beers, of the formula:

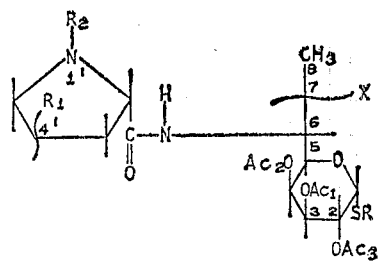

wherein R is methyl or ethyl; $R_1$ is cis or trans alkyl of 2 to 8 carbon atoms, inclusive; $R_2$ is hydrogen or alkyl to 8 carbon atoms, inclusive; X is hydroxy, chlorine, bromine, or iodine, each in the (R) or (S) configuration; $Ac_1$ and $Ac_2$ are hydrogen or acyl, selected independently, wherein acyl is the acyl of a hydrocarbon carboxylic acid of not more than 18 carbon atoms, or a halo-, nitro-, hydroxy-, amino-, cyano-, thiocyano-, or loweralkoxy hydrocarbon carboxylic acid of a total of up to 18 carbon atoms; and, $Ac_3$ is of the same group as $Ac_1$ and $Ac_2$, or phosphate, are adsorbed on the resin in the process as disclosed in Example 1.

EXAMPLE 7

Upon substituting whole streptomycin fermentation beer for the streptomycin solution in Example 3, the streptomycin is adsorbed onto the resin and eluted therefrom in the same manner as shown in Example 3.

EXAMPLE 8

Upon substituting whole neomycin fermentation beer for the streptomycin solution in Example 3, the neomycin is adsorbed onto the resin and eluted therefrom in the same manner as show in Example 3.

EXAMPLE 9

The following compounds, present in whole fermentation beers, are adsorbed on the resin in the process as disclosed in Example 1: celesticetin, tetracycline, oxytetracycline, oleandomycin, novobiocin, penicillin G, penicillin V, and gibberellic acid.

What is claimed is:

1. A process for isolating a lincomycin antibiotic from fermentation beers or aqueous processing solutions, wherein said lincomycin antibiotic has the structural formula:

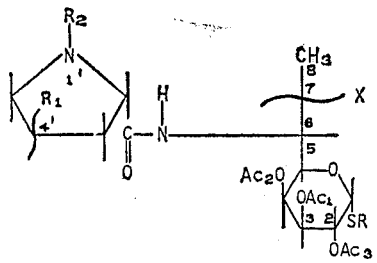

wherein R is methyl or ethyl; $R_1$ is cis or trans alkyl of 2 to 8 carbon atoms, inclusive; $R_2$ is hydrogen or alkyl to 8 carbon atoms, inclusive; X is hydroxy, chlorine, bromine, or iodine, each in the (R) or (S) configuration; $Ac_1$ and $Ac_2$ are hydrogen or acyl, selected independently, wherein acyl is the acyl of a hydrocarbon carboxylic acid of not more than 18 carbon atoms, or a halo-, nitro-, hydroxy-, amino-, cyano-, thiocyano-, or lower alkoxy hydrocarbon carboxylic acid of a total of up to 18 carbon atoms; and, $Ac_3$ is of the same group as $Ac_1$ and $Ac_2$, or phosphate, which comprises contacting said fermentation beers or aqueous processing solutions with a resin comprising a non-ionic macro porous copolymer of styrene cross-linked with divinylbenzene, and eluting said lincomycin antibiotic from said resin with an organic or aqueous organic solvent in which the sorbed lincomycin antibiotic is soluble.

2. A process, according to claim 1, for isolating lincomycin from fermentation beers which comprises contacting a fermentation beer containing lincomycin with a resin comprising a non-ionic macro porous copolymer styrene cross-linked with divinylbenzene, and eluting lincomycin from said resin with an organic or aqueous organic solvent in which lincomycin is soluble.

3. A process, according to claim 1, for isolating lincomycin from a solution containing lincomycin which comprises contacting said solution containing lincomycin with Amberlite XAD-2 resin, and eluting lincomycin from said resin with methyl ethyl ketone 4. A process, according to claim 1, for isolating lincomycin from a screened whole fermentation beer which comprises contacting said beer containing lincomycin with Amberlite XAD-2 resin, and eluting lincomycin from said resin with methyl ethyl ketone.

5. A process for isolating streptomycin from a whole fermentation beer or an aqueous solution which comprises contacting said whole fermentation beer or aqueous solution with a resin comprising a non-ionic macro porous copolymer of styrene cross-linked with divinylbenzene, and eluting streptomycin from said resin with a solvent for streptomycin.

6. A process, according to claim 5, for isolating streptomycin from a whole fermentation beer which comprises contacting said beer with Amberlite XAD-2 resin and eluting streptomycin from said resin.

7. A process, according to claim 5, for isolating streptomycin from an aqueous solution which comprises contacting said aqueous solution with Amberlite XAD-2 resin and eluting streptomycin from said resin.

8. A process for isolating neomycin from a whole fermentation beer which comprises contacting said beer with Amberlite XAD-2 resin and eluting neomycin from said resin with a solvent for neomycin.

9. A process, according to claim 8, for isolating neomycin from an aqueous solution which comprises contacting said aqueous solution with Amberlite XAD-2 resin and eluting neomycin from said resin with a solvent for neomycin.

10. A process for isolating compounds selected from the group consisting of celesticetin, tetracycline, oxytetracycline, oleandomycin, novobiocin, penicillin G, penicillin V, and gibberellic acid from whole fermentation beers which comprises contacting said whole fermentation beer with a resin comprising a non-ionic macro porous copolymer of styrene cross-linked with divinyl-benzene, and eluting said compound from said resin with an organic or aqueous organic solvent for said compound.

References Cited

UNITED STATES PATENTS

| | | |
|---|---|---|
| 2,960,437 | 11/1960 | Friedman et al. |
| 2,987,441 | 6/1961 | Brudney et al. _____ 260—239.1 |
| 3,005,815 | 10/1961 | Miller. |
| 3,121,714 | 2/1964 | Gollaher et al. |
| 3,221,008 | 11/1965 | Wolf et al. _____ 260—239.1 |

OTHER REFERENCES

Kunin et al.: "Jour. Amer. Chem. Soc.," vol. 84, Jan. 20, 1962, pp. 305–306.

LEWIS GOTTS, Primary Examiner

J. R. BROWN, Assistant Examiner

U.S. Cl. X.R.

260—239.1, 343.3, 559

UNITED STATES PATENT OFFICE
CERTIFICATE OF CORRECTION

Patent No. 3,515,717    Dated June 2, 1970

Inventor(s) Dae Yang Cha and Heinz K. Jahnke

It is certified that error appears in the above-identified patent and that said Letters Patent are hereby corrected as shown below:

Column 3, line 18, for "380,992" read -- 3,380,992 --; line 26, for "filled" read -- filed --. Column 4, line 75, for "show" read -- shown --. Column 6, line 39, for "Friedman et al." read -- Friedman et al. 260 260AB --; line 41, for "Miller" read -- Miller 260 210NEO --; line 42, for "Gollaher" read -- Gollaher 260 210AB --.

SIGNED AND
SEALED
JAN 5 1971

(SEAL)
Attest:

Edward M. Fletcher, Jr.
Attesting Officer

WILLIAM E. SCHUYLER, JR.
Commissioner of Patents